Sept. 10, 1957 B. HARRIS ET AL 2,806,136

CONTROLLED MODULATION CIRCUIT

Filed May 14, 1954

WITNESSES:
E. A. McCloskey.
T. H. Murray

INVENTORS
Bernard Harris, Howard B. Dobyns
and Frederic S. Beale.
BY
F. E. Browder
ATTORNEY 2,806,136

CONTROLLED MODULATION CIRCUIT

Bernard Harris and Frederic S. Beale, Baltimore, Md., and Howard B. Dobyns, Bellflower, Calif., assignors to Westinghouse Electric Corporation, East Pittsburgh, Pa., a corporation of Pennsylvania Application May 14, 1954, Serial No. 429,902

11 Claims. (Cl. 250—13)

Figures 1, 2:
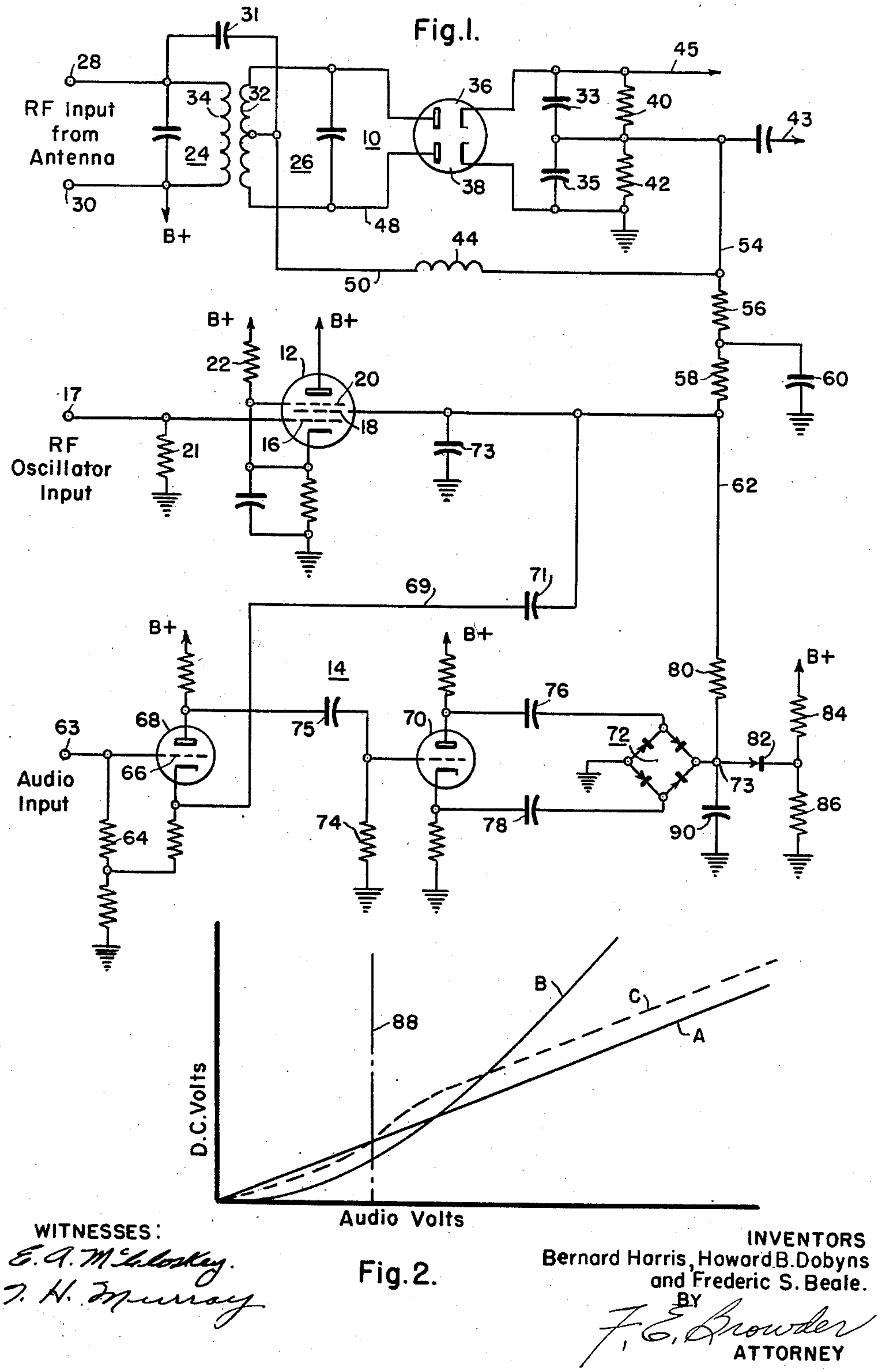

This invention relates to a modulation circuit for use in a radio network capable of transmitting and receiving signals, and more particularly to a modulation circuit of the type described which is controlled in response to a voltage whose magnitude depends upon the voltage levels of received and transmitted signals.

In obtaining party-line communication in a microwave communications system, it is necessary to establish a voice channel having a number of parallel terminals located at various stations in the system. When a voice channel is established, all carrier sources emanating from the various stations in the system must be operating at the same frequency. If the carrier source frequencies are not exactly the same, beat notes or heterodyne "whistles" will be heard at each voice terminal on the party line.

Heterodyne interference has been commonly prevented by operating the party-line carrier "single-sideband" which means that the carrier frequency in one of the two intelligence-carrying sideband frequencies is filtered out, and only the remaining sideband is put into the microwave radio transmitter. One sideband will not create heterodyne interference when mixed with other similar signals in the carrier receivers. At each carrier receiver, it is then necessary to reinsert a carrier frequency identical to the original in order to recover the intelligence being carried by the one sideband.

The single sideband system is relatively expensive and has certain undesirable characteristics from the user's point of view. The relatively narrow band and sharp cutoff filters needed to separate the carrier frequencies from the sidebands result in comparatively bulky and complex equipment for each channel. A more serious objection is the fact that it is often difficult to maintain the frequency of the reinserted carrier at the receiving and exactly the same as the original carrier frequency that was suppressed at the sending end. If these two frequencies are not identical, it is impossible to use certain types of high fidelity signals. If the two frequencies drift far enough apart, even regular speech signals become sufficiently translated in frequency range to become unusable.

In view of the deficiencies of "single sideband" operation, the inexpensive network described herein was devised whereby it is possible to prevent "beats" or heterodyne interference by allowing only one station in the channel to transmit signals at any one time. The circuit embodied in the present invention is such that when one person is talking, the transmitters of the other parties in the system are normally kept disabled. This is accomplished by cutting off the carrier frequency output of a station in the channel when the level or amplitude of the received audio signal is greater than the level of the audio signal which is intended to be transmitted from that station. Therefore, the only station in a channel which can transmit at any one time is the one having the greatest output audio level. Anyone in the channel who is listening to this audio signal may interrupt the remote party who is talking by simply raising the level of his speech above that of the received signal. Actually, the level of the incoming speech is irregular (i. e., varies over a wide range of amplitudes in a fraction of a second) so that the remote party can be interrupted by the listening party in most cases even without raising his speech level.

The detailed operation of the above-described system will become apparent from the following description taken in connection with the accompanying drawing which forms a part of this specification, and in which:

Figure 1 is a schematic drawing illustrating the circuitry of the invention; and Fig. 2 is a graphical illustration of the operation of the modified full-wave voltage rectifier of the circuit.

Referring to Fig. 1, the transmitting and receiving system shown includes a discriminator detector circuit 10, a modulator tube 12, and a squirt modulation circuit 14. The modulator tube is used in a conventional manner to combine radio-frequency carrier energy with audio signal voltage. Essentially, the tube 12 comprises a pentode having a control grid 16, screen grid 18, and suppressor grid 20. Control grid 16 is connected at terminal 17 to a source of radio-frequency waves, not shown, by means of a load resistor 21; and suppressor grid 20 is connected to the cathode of the tube as shown. Dropping resistor 22 is connected between the cathode and the positive side of the anode voltage source of tube 12 to insure that the suppressor grid 20 renders screen grid 18 negative with respect to the cathode at all times. Connected to screen grid 18 by means which will be described hereinafter is a source of amplitude modulating voltage.

The discriminator detector circuit 10 disclosed herein is known generally as a Foster-Seeley circuit and is used primarily for detection of frequency-modulated signals. It includes a pair of resonant circuits 24 and 26 tuned to the same operating frequency. Connected to input terminals 28 and 30 of circuit 24 is a source of high frequency waves which may be derived from any suitable signal generator. In the present instance, these waves are received from a radio transmitter located at some distant point. The high alternating current side of coil 34 in circuit 24 is connected through condenser 31 to a center tap on coil 32 of circuit 26 so that two alternating current potentials of like polarity exists between the ends of circuit 26 and the said high alternating current side of coil 34. Coils 32 and 34 are also magnetically coupled. Connected to the opposite ends of coil 32 are a pair of diodes 36 and 38. The cathodes of these diodes are connected together through a pair of series load resistors 40 and 42, and the center point of these resistors is, in turn, connected through choke 44 to the center tap on coil 32. Each resistor is shunted by a capacitor 33 or 35.

Since the Foster-Seeley circuit per se forms no part of the present invention and is well known in the art, a detailed explanation of its operation is not included herein. It will be sufficient to say that if a frequency-modulated signal is applied to input terminals 28 and 30, a voltage will appear between output terminal 45 and ground. The polarity of this signal depends upon whether the frequency of the signal applied to input terminals 28 and 30 is above or below the resonant frequency of circuit 24 and the amplitude of the signal depends upon the degree of change of the input signal frequency from said resonant frequency. An output voltage will be produced by the discriminator when, and only when, the frequency of the input signal departs from the resonant frequency of circuit 24.

For purposes of the present invention, it is important to note that each half of the Foster-Seeley circuit constitutes a simple diode detector network comprising, for example, input paths 48 and 50, a diode 38, and an RC filter circuit composed of a load resistor 42 and a capacitor 35. Therefore, if an amplitude-modulated signal is applied to input terminals 28 and 30, this signal will appear across the bottom half of coil 32 and will be detected to produce a direct-current voltage across resistor 42 which is negative with respect to ground. This voltage, which is proportional to the level of a detected signal, is applied through path 54 to screen grid 18 in modulator tube 12. A pair of dropping resistors 56 and 58 are included in path 54. These resistors serve to effectively isolate the high impedance of the discriminator load resistor 42 from the comparatively low impedance of screen grid 18. Connected in shunt with path 54 is a radio-frequency by-pass condenser 60 which serves to filter radio-frequency components from the voltage produced across resistor 42.

The audio voltage appearing across resistor 42 is connected through output lead 43 to standard radio apparatus and finally applied to a speaker or other speech reproducing means. Voltage will appear between output lead 45 and ground in response to application of a frequency-modulated wave to input terminals 28 and 30 in the manner described above. In actual practice, frequency modulation is used in this connection as an alarm system. When a caller wishes to signal a party at a remote station in the system in order to have that party lift the receiver and establish communication between the stations, he simply actuates a transmitter which sends a source of frequency-modulated waves toward the antenna of the remote station so that these waves appear across input terminals 28 and 30. The frequency-modulated wave will, therefore, be detected by discriminator circuit 10, and a voltage will appear between lead 45 and ground. This voltage is, in turn, applied to the grid of a tube which has an alarm relay in its plate circuit. This tube is rendered conducting or non-conducting to thereby actuate the relay in response to the voltage induced on the grid when a frequency-modulated signal is detected by circuit 10. It can thus be seen that amplitude modulation is used in the system to transmit audio signals, and frequency moduation is used for alarm purposes.

Also connected to grid 18 through path 62 is a source of positive bias voltage. This voltage is produced by squirt moducation circuit 14. Referring to circuit 14, it can be seen that a source of audio voltage at terminal 63 is connected across resistor 64 and applied to grid 66 of a triode amplifier 68. The output of the amplifier is applied to two circuits, one of which includes a path 69 and the screen grid 18 of modulator tube 12. This circuit serves to impress the output of amplifier 68 on grid 18 to thereby modulate the carrier signal impressed on control grid 16. The other circuit includes a phase inverter 70 which supplies audio signal to a full-wave voltage doubler rectifier 72. Connected between grid 18 and amplifier 68 is a D. C. blocking condenser 71 and a radio-frequency by-pass condenser 73 which serves to ground RF oscillations imposed on grid 18 by control grid 16.

Amplifier 68 is resistively coupled to the phase inverter 70 by means of load resistor 74 and D. C. blocking capacitor 75, and the phase inverter is connected to the rectifier through a pair of direct-current blocking capacitors 76 and 78. The direct-current output of the rectifier is then applied through dropping resistor 80 and path 62 to grid 18 in tube 12. It can readily be seen that the direct-current output of the rectifier is directly proportional to the amplitude of the applied audio signal, assuming that the rectifier has linear characteristics. Actually, however, the voltage output of the rectifier is not linear due to the characteristics of the individual selenium rectifiers which are used in the branches of the full-wave rectifier. This non-linearity can be improved by an added selenium rectifier 82 which is connected to the D. C. output of the full-wave rectifier 72 through terminal 73. Rectifier 82 is biased by resistors 84 and 86 so that it will conduct only after the output of full-wave rectifier 72 has increased past a predetermined amount.

Referring to Fig. 2 graphically illustrating the operation of the rectifier, curve A represents the ideal operating condition of the rectifier (i. e., audio volts are directly proportional to D. C. output volts); curve B represents the actual operating characteristic of the full-wave rectifier by itself; and curve C represents the operating characteristic with rectifier 82 included in the circuit. Due to bias resistors 84 and 86, rectifier 82 will not start to conduct until audio volts reach a value represented by 88. At this point, rectifier 82 will fire and will effectively bleed off part of the D. C. output voltage so that curve C becomes substantially a straight line.

Connected between terminal 73 of rectifier 72 and ground is a capacitance 90 having a relatively low reactance value. This capacitor serves a dual purpose: It acts as a filter for the D. C. output of the full-wave rectifier 72, and it is also used as a time constant to control the length of time it takes to apply or release the positive D. C. voltage on the screen grid. Since a certain amount of time will be involved in the discharge of capacitance 90 after the output of rectifier 72 falls below that required to bias grid 18 positively, the final sounds or syllables of the speaker's voice which induce the rectifier output will not be "clipped" or cut off abruptly.

Operation of the system is as follows: When an audio signal is not applied to input terminal 63, modulator tube 12 is made non-conducting by operating screen grid 18 at a slight negative potential with respect to the cathode. When an audio signal is applied to terminal 63, it will be amplified in tube 68 and applied to grid 18. The audio signal will also cause a direct current output in rectifier 72 which is proportional to the level of the incoming audio signal. This output is applied to grid 18 making it positive with respect to the cathode to thereby initiate conduction in modulator tube 12.

Since the potential developed across load resistor 42 of discriminator 10 in response to a received amplitude-modulated signal is also applied to grid 18 tending to make it negative with respect to the cathode, it can readily be seen that grid 18 will be either negative or positive (and tube 12 will be either conducting or non-conducting) depending upon whether or not the negative voltage developed across resistor 42 is larger than the positive voltage developed across rectifier 72. In other words, the voltages produced by circuits 10 and 14 are applied to screen grid 18 in subtractive or opposing effect. Since the voltages developed across resistor 42 and rectifier 72 are directly proportional to the level or amplitude of the received and transmitted audio signals, the polarity of grid 18 will be positive or negative depending upon whether the received or transmitted audio signal is greater in amplitude. Therefore, one who is listening to incoming signals may interrupt the remote party who is transmitting those signals by simply raising his voice so that the amplitude of the audio signal which he produces is greater than the amplitude of the received signal. In most cases, the listener can interrupt the remote party without raising his voice since the level of the incoming speech is irregular in most cases (i. e., the amplitude varies over a wide range in a fraction of a second so that interruption may occur at any instant when the amplitude is low). It can thus be seen that the system lends itself to providing a D. C. holding or compensating voltage which is more or less proportional to the difference between the levels of the transmitted and received signals.

Although a single embodiment of our invention has been shown and described in detail, it will be understood by those skilled in the art that various changes in form and arrangement of parts can be made to suit requirements.

We claim as our invention:

1. In a signal receiving and transmitting system, a discriminator detector network for receiving modulated signals, a load impedance included in said discriminator network for producing a direct current voltage in response to reception of an amplitude modulated signal, said voltage being negative with respect to ground, a modulator tube in the system, said tube having a screen grid therein, means for applying said direct current voltage to said grid to bias the same with respect to the cathode of said tube, a triode tube having its cathode coupled to said grid, a source of audio voltage connected to the grid of said triode, a second triode tube resistively coupled to said first triode, a load circuit for said second triode tube including a full wave voltage doubler rectifier for producing a voltage which is positive with respect to ground, and means for applying the output voltage of said rectifier to the screen grid of said modulator tube to bias the same in opposition to the bias produced by said first-mentioned direct current voltage.

2. In a signal receiving and transmitting system, a discriminator detector network for receiving modulated signals, means included in said discriminator network for producing a direct current voltage in proportion to the level of a received signal, a modulator tube in the system, said tube having a grid therein, means for applying said direct current voltage to said grid to bias the same with respect to the cathode of said tube, a triode tube having its cathode coupled to said grid, means for rectifying the output of said triode, and means for applying said rectified output to the grid of the modulator tube to bias the same in opposition to the bias produced by said first-mentioned direct current voltage.

3. In a signal receiving and transmitting system, a detector network for receiving incoming audio signals, said network including means for producing a direct current voltage in response to a received audio signal, a modulator tube in the system for transmitting signals, a screen grid included in said tube, a source of audio output voltage connected to said grid, means responsive to said audio output voltage for producing a direct current voltage, and means for applying the voltages produced by said detector network and said last-mentioned means to said screen grid in opposition whereby the grid will be biased with respect to the cathode of said tube in an amount equal to the difference between the voltages produced by said detector and said audio voltage responsive means.

4. In a communication system, a discriminator detector network for receiving incoming modulated signals, means in said detector network for producing a direct current voltage in response to an amplitude modulated signal, an electronic discharge tube in the system for transmitting signals, said tube having a plurality of grids therein, a source of modulation voltage connected to one of said grids, means responsive to said modulation voltage for producing a direct current voltage, and means for applying to said one grid in subtractive relationship the direct current voltages produced by said detector network and said modulation voltage responsive means.

5. In a communication system, a discriminator detector network for receiving incoming modulated signals, means in said detector network for producing a direct current voltage which is proportional to the level of a received amplitude modulated signal, an electronic discharge tube in the system for transmitting signals, said tube having a plurality of grids included therein, a source of modulation voltage connected to one of said grids, means responsive to said modulation voltage for producing a direct current voltage which is proportional to the level of the modulation voltage, and means for applying to said one grid in subtractive relationship the direct current voltages produced by said detector network and said modulation voltage responsive means to thereby bias said grid with respect to the cathode of said tube in an amount equal to the difference between the voltages produced by the detector and the modulation voltage responsive means.

6. In a signal receiving and transmitting system, a detector network for receiving incoming signals, said network including means for producing a first control voltage upon reception of a signal, a pentode modulator tube for transmitting signals, said tube having control, screen, and suppressor grids therein, a source of carrier frequency voltage connected to said control grid, a connection between said suppressor grid and the cathode of said tube, a source of modulation voltage connected to said screen grid, means responsive to said modulation voltage for producing a second control voltage, and means for applying said first and second control voltages to said screen grid in subtractive relationship to thereby bias the grid in an amount equal to the difference between said first and second control voltages.

7. In a two-way communication system, a detector network for receiving incoming signals, said network including means for producing a first control voltage upon reception of a signal, a modulator device in the system for transmitting signals, said device having at least one electrically responsive control element included therein, a source of modulation voltage connected to said control element, means responsive to said modulation voltage for producing a second control voltage, and means for applying said first and second control voltages to said control element in subtractive relationship.

8. In a signal receiving and transmitting system, means responsive to a received signal for producing a direct current voltage which is proportional to the level of said received signal, a modulating device in the system for transmitting signals, electrically responsive control means included in said modulating device, a source of modulation voltage for said modulating device, means responsive to said source of modulation voltage for producing a direct current voltage which is proportional to the level of said modulation voltage, and means for applying said direct current voltages to said electrically responsive means in opposition to thereby control the output of said modulating device in accordance with the difference existing between the level of the direct current voltage produced by the modulation voltage and the level of the direct current voltage produced by said received signal.

9. In a signal receiving and transmitting system including a detector network for receiving signals and a modulator tube for transmitting signals, means associated with said detector network for producing a first direct current voltage upon reception of a modulated signal, a grid included in said modulator tube, means for impressing at least a portion of said first direct current voltage on said grid to thereby bias the same negatively with respect to the cathode of said tube, a rectifying device responsive to signals transmitted from said system for producing a second direct current voltage, and means for impressing at least a portion of said second direct current voltage on said grid to thereby bias the same positively with respect to the cathode of said tube.

10. In a signal receiving and transmitting system employing a detector network for receiving signals and a modulator tube for transmitting signals, means included in said detector network for producing a direct current voltage which is proportional to the level of a received signal, a grid for said modulator tube, a source of direct current voltage which varies as a function of the level of signals transmitted from said system, and means for impressing said voltages on said grid with opposing polarities.

11. In a signal receiving and transmitting system, means responsive to a received signal for producing a direct current voltage which is proportional to the amplitude of said received signal, means responsive to a transmitted signal for producing a direct current voltage which is proportional to the amplitude of said transmitted signal, a modulating device in the system for transmitting signals, electrically responsive control means included in said modulating device, and means for applying said direct current voltages to said electrically responsive means with opposing polarities to thereby control the output of said modulating device in accordance with the levels of said received and transmitted signals.

References Cited in the file of this patent

UNITED STATES PATENTS

| | | |
|---|---|---|
| 2,194,516 | Anderson | Mar. 26, 1940 |
| 2,275,287 | Crosby | Mar. 3, 1942 |
| 2,296,092 | Crosby | Sept. 15, 1942 |
| 2,503,727 | Grondahl et al. | Apr. 11, 1950 |
| 2,610,293 | Hanchett | Sept. 9, 1952 |
| 2,671,849 | Bartelink | Mar. 9, 1954 |